(12) United States Patent
Kobayashi et al.

(10) Patent No.: US 10,984,963 B2
(45) Date of Patent: *Apr. 20, 2021

(54) CARBONACEOUS MATERIAL, CARBONACEOUS MATERIAL-CONTAINING ELECTRODE MATERIAL FOR ELECTRIC DOUBLE LAYER CAPACITOR, ELECTRODE FOR ELECTRIC DOUBLE LAYER CAPACITOR, AND ELECTRIC DOUBLE LAYER CAPACITOR

(71) Applicant: KURARAY CO., LTD., Kurashiki (JP)

(72) Inventors: Shohei Kobayashi, Kurashiki (JP);
Motomi Matsushima, Kurashiki (JP);
Taketoshi Okuno, Kurashiki (JP);
Hideharu Iwasaki, Kurashiki (JP)

(73) Assignee: KURARAYCO., LTD., Kurashiki (JP)

( * ) Notice: Subject to any disclaimer, the term of this patent is extended or adjusted under 35 U.S.C. 154(b) by 18 days.

This patent is subject to a terminal disclaimer.

(21) Appl. No.: 16/488,488

(22) PCT Filed: Feb. 23, 2018

(86) PCT No.: PCT/JP2018/006783
§ 371 (c)(1),
(2) Date: Aug. 23, 2019

(87) PCT Pub. No.: WO2018/155647
PCT Pub. Date: Aug. 30, 2018

(65) Prior Publication Data
US 2019/0378662 A1    Dec. 12, 2019

(30) Foreign Application Priority Data

Feb. 27, 2017  (JP) .............................. JP2017-035318

(51) Int. Cl.
*H01G 11/34* (2013.01)
*C01B 32/354* (2017.01)
*H01G 11/42* (2013.01)
*H01G 11/86* (2013.01)

(52) U.S. Cl.
CPC ........... *H01G 11/34* (2013.01); *C01B 32/354* (2017.08); *H01G 11/42* (2013.01); *H01G 11/86* (2013.01); *C01P 2006/12* (2013.01); *C01P 2006/16* (2013.01)

(58) Field of Classification Search
CPC ........ H01G 11/34; H01G 11/32; H01G 11/42; H01G 11/86; C01B 32/354; C01P 2006/12; C01P 2006/16
See application file for complete search history.

(56) References Cited

U.S. PATENT DOCUMENTS

| | | | |
|---|---|---|---|
| 10,096,837 B2* | 10/2018 | Iijima | H01M 4/926 |
| 2015/0270072 A1* | 9/2015 | Sonobe | C01B 32/00 361/502 |
| 2016/0064735 A1 | 3/2016 | Tada et al. | |
| 2019/0295782 A1* | 9/2019 | Kobayashi | C01B 32/318 |
| 2019/0375641 A1* | 12/2019 | Kobayashi | H01G 11/42 |
| 2020/0044261 A1* | 2/2020 | Iijima | C01B 32/05 |
| 2020/0308006 A1* | 10/2020 | Kobayashi | C01B 32/318 |

FOREIGN PATENT DOCUMENTS

| | | |
|---|---|---|
| EP | 3 460 816 A1 | 3/2019 |
| JP | 10-106900 A | 4/1998 |
| JP | 2000-138141 A | 5/2000 |
| JP | 2000138141 A * | 5/2000 |
| JP | 2003-209029 A | 7/2003 |
| JP | 2006-4997 A | 1/2006 |
| JP | 2007-73810 A | 3/2007 |
| JP | 2008-153694 A | 7/2008 |
| JP | 2008-252062 A | 10/2008 |
| WO | WO 2014/034858 A1 | 3/2014 |
| WO | WO 2014/034859 A1 | 3/2014 |
| WO | WO 2017/199686 A1 | 11/2017 |

OTHER PUBLICATIONS

English translation of the International Preliminary Report on Patentability and Written Opinion of the International Searching Authority dated Sep. 6, 2019 in PCT/JP2018/006783 filed Feb. 23, 2018, 8 pages.
International Search Report dated Apr. 3, 2018 in PCT/JP2018/006783 filed on Feb. 23, 2018.
"Jisedai Kyapasita Kaihatsu Saizensen (Front Line of Next-Generation Capacitor Development)" supervised by Katsuhiko Naoi and Atsushi Nishino, Gijutu Kyouiku Shuppan-sha, 2009, 5 pages (with partial unedited computer-generated English translation).
Third Party Observation dated Jun. 25, 2019 in PCT/JP2018/006783 filed on Feb. 23, 2018.

* cited by examiner

*Primary Examiner* — Nathan Milakovich
(74) *Attorney, Agent, or Firm* — Element IP, PLC

(57) ABSTRACT

The present invention relates to a carbonaceous material having a specific surface area of 1,800 $m^2/g$ to 3,000 $m^2/g$ according to a BET method, an R-value of 1.2 or more and a G-band half-value width of 70 $cm^{-1}$ or more according to a Raman spectrum.

11 Claims, No Drawings ent generated moisture, for example, aluminum powder reactive
CARBONACEOUS MATERIAL, CARBONACEOUS MATERIAL-CONTAINING ELECTRODE MATERIAL FOR ELECTRIC DOUBLE LAYER CAPACITOR, ELECTRODE FOR ELECTRIC DOUBLE LAYER CAPACITOR, AND ELECTRIC DOUBLE LAYER CAPACITOR

TECHNICAL FIELD

The present invention relates to a carbonaceous material. The present invention also relates to a method for producing the carbonaceous material, an electrode material for an electric double layer capacitor containing the carbon material, an electrode for an electric double layer capacitor, and an electric double layer capacitor.

BACKGROUND ART

An electric double layer capacitor is an electric storage device storing an electric charge in an ion adsorption layer, i.e., an electric double layer, formed on a pore surface in a porous carbon electrode of activated carbon etc. and can repeatedly be used by being charged. Because of a long life and high output, this electric double layer capacitor is widely used as a back-up power source of a memory of a computer or a backup power supply at the time of an instantaneous power failure and is recently rapidly attracting attention as an electric power storage system mounted on a railway car and an auxiliary power source of a hybrid vehicle.

To improve the energy density of the electric double layer capacitor, recently developed hybrid capacitors utilize not only activated carbon electrodes but also active materials of lithium ion secondary batteries as electrode materials. One of the hybrid capacitors is a lithium ion capacitor. In this lithium ion capacitor, activated carbon is used for a positive electrode, a carbon material for a lithium ion battery negative electrode is used for a negative electrode, and an organic electrolytic solution for a lithium ion battery is used for an electrolytic solution.

The electric double layer capacitor is charged by connecting a power source between respective activated carbon electrodes of the positive electrode and the negative electrode immersed in an electrolytic solution and applying a voltage. During charging, electrolyte ions are adsorbed on the electrode surface. Specifically, anions in the electrolytic solution and cations in the electrolytic solution are attracted on the positive electrode and the negative electrode, respectively, to form an electric double layer. This state is maintained even when the power supply is removed, and a charged state is maintained without using a chemical reaction. At the time of discharge, the adsorbed cations and anions are desorbed from the respective electrodes. As described above, the process of charging and discharging is associated with no change in capacitor materials, and therefore, heat generation and deterioration due to a chemical reaction do not occur, so that a long life can be ensured.

The electric double layer capacitors generally have characteristics such as (1) charge and discharge at high speed, (2) a long cycle life, and (3) environment-friendliness resulting from the absence of the use of heavy metal in electrodes and electrolytes, as compared to secondary batteries. These features are derived from the fact that the capacitors operate according to physical absorption and desorption of ions and are not accompanied by an electron transfer reaction of chemical species.

Regarding development of electric double layer capacitors, for example, Patent Document 1 discloses that a carbon fiber woven fabric is subjected to an activation treatment followed by heat treatment at 700 to 1,000° C. under an inert gas atmosphere to remove moisture and surface functional groups adsorbed on an activated carbon fiber woven fabric, thereby providing an electric double layer capacitor with high withstand voltage and excellent long-term reliability.

In an example disclosed in Patent Document 2, based on the idea that decomposition of an electrolyte solution is caused by an acid resulting from moisture generated inside a positive electrode, various antacids are added to an activated carbon polarizable electrode.

In an example disclosed in Patent Document 3, based on the idea that decomposition of an electrolyte solution is caused by hydrogen ions resulting from electrolysis of generated moisture, for example, aluminum powder reactive with hydrogen ions or absorbing hydrogen ions is added to the inside of an electrode.

Patent Document 4 discloses that surface functional groups of a carbonaceous material serving as a main component of a polarizable electrode are reacted with an organic silicon compound and capped by chemical bonding to prevent the surface functional groups from generating a gas and reacting with an electrolytic solution.

PRIOR ART DOCUMENTS

Patent Documents

Patent Document 1: Japanese Laid-Open Patent Publication No. 2003-209029
Patent Document 2: Japanese Laid-Open Patent Publication No. 2007-73810
Patent Document 3: Japanese Laid-Open Patent Publication No. 10-106900
Patent Document 4: Japanese Laid-Open Patent Publication No. 2008-252062

Non-Patent Literature

Nonpatent Literature 1: "Jisedai Kyapasita Kaihatsu Saizensen (Front Line of Next-Generation Capacitor Development)" supervised by Katsuhiko Naoi and Atsushi Nishino, Gijutu Kyouiku Shuppan-sha, 2009, pp. 91 and 141

SUMMARY OF THE INVENTION

Problem to be Solved by the Invention

Since an energy (E) stored in an electric double layer capacitor is proportional to a product of a square of a charging voltage (V) and an electric double layer capacity (C) ($E=CV^2/2$), an energy density is effectively improved by improving the capacity and the charging voltage. The charging voltage of the electric double layer capacitor is usually suppressed to about 2.5 V. This is conceivably because charging with a voltage of 3 V or more starts electrolysis of electrodes and an electrolytic solution so that the capacity decreases over time and results in degradation of the electric double layer capacitor.

Although the cause of the time degradation of the electric double layer capacitor over time is unknown, the following mechanism is conceivable. The electric double layer capacitor has therein a residual moisture in the electrolytic solution and a moisture mixed at the time of assembly. Additionally, physically adsorbed water and chemically-bonded adsorbed water are present on the surface and inside of activated carbon, a conductive auxiliary agent, a binder, a separator, etc. used for an electrode layer. These moistures are desorbed as water during repetition of charge and discharge and electrolyzed by voltage application, generating a gas, and causes decomposition of the electrolyte, generating decomposition products. These decomposition products coat the surface of the activated carbon or block pores of the activated carbon, thereby decreasing the surface area of the activated carbon and causing a reduction in the electrostatic capacity.

Since the activated carbon used for the electric double layer capacitor has a large surface area for increasing the adsorption capacity and therefore has a catalytic action, it is difficult to avoid decomposition of an electrolyte solution. It is considered that this catalytic action is caused by functional groups on the surface of the activated carbon (see Nonpatent Literature 1).

From these facts, it is thought that reduction of moisture, suppression of reduction in surface area of activated carbon due to decomposition products, and suppression of decomposition of electrolytic solution are effective for development of a high withstand voltage electric double layer capacitor. These development techniques are considered as being related to each other rather than being independent of each other.

In the electric double layer capacitor described in Patent Document 1, adsorbed-moisture and surface functional groups on an activated carbon fiber woven fabric can be removed by heat-treating the activated carbon fiber woven fabric at 700 to 1,000° C. under an inert gas atmosphere. However, this possesses a problem of re-adsorption of moisture and re-introduction of surface functional groups unless the activated carbon fiber woven fabric after the removal is kept and assembled into an electric double layer capacitor in a completely dehumidified state, which is not practical.

In the electric double layer capacitor described in Patent Document 2, the antacids may be decomposed or reacted with the electrolytic solution at the time of charge and discharge of the electric double layer capacitor in some cases, causing a problem of a temporal reduction in the electrostatic capacity and the energy density in long-term use. In the electric double layer capacitor described in Patent Document 3, aluminum may react with electrolyte ions and, for example, aluminum fluoride etc. may be synthesized. Aluminum fluoride is an insulator and may raise a resistance, which is less preferable.

Furthermore, in the electric double layer capacitor described in Patent Document 4, the method of capping the surface functional groups of the activated carbon by using an organic silicon compound may cause not only the capping of the surface functional groups but also blocking of pores of the activated carbon depending on production conditions, thereby causing a problem of a temporal reduction in the electrostatic capacity.

Therefore, an object of the present invention is to provide a carbonaceous material used for an electric double layer capacitor having a high electrostatic capacity and capable of maintaining the high electrostatic capacity and energy density over a long period and a method for producing the same.

Means for Solving Problem

As a result of intensive studies for achieving the object, the present inventors conceived the present invention. Therefore, the present invention comprises the following preferred aspects.

[1] A carbonaceous material having a specific surface area of 1,800 $m^2/g$ to 3,000 $m^2/g$ according to a BET method, an R-value of 1.2 or more and a G-band half-value width of 70 $cm^{-1}$ or more according to a Raman spectrum.

[2] The carbonaceous material according to [1], wherein the carbonaceous material is derived from a plant.

[3] The carbonaceous material according to [1] or [2], wherein the material has a potassium element content of 1,000 ppm or less.

[4] The carbonaceous material according to any one of [1] to [3], wherein the material has an iron element content of 200 ppm or less.

[5] The carbonaceous material according to any one of [1] to [4], wherein the material has a hydrogen element content of 0.47 wt % or less.

[6] A method for producing the carbonaceous material according to any one of [1] to [5], the method comprising:

a high-temperature halogen-compound treatment step of heat-treating an activated carbon having an average particle diameter of 100 μm to 10,000 μm and a specific surface area of 1,600 $m^2/g$ to 3,000 $m^2/g$ according to a BET method at 500° C. to 1,250° C. in an inert gas atmosphere containing a halogen compound to obtain a carbonaceous material.

[7] A method for producing the carbonaceous material according to any one of [1] to [5], the method comprising:

an impregnation step of impregnating an activated carbon having an average particle diameter of 100 μm to 10,000 μm and a specific surface area of 1,600 $m^2/g$ to 3,000 $m^2/g$ according to a BET method with an alkali metal hydroxide to obtain an alkali metal hydroxide-impregnated activated carbon, and a high-temperature halogen-compound treatment step of heat-treating the alkali metal hydroxide-impregnated activated carbon at 500° C. to 1,250° C. in an inert gas atmosphere containing a halogen compound to obtain a carbonaceous material.

[8] An electrode material for an electric double layer capacitor comprising the carbonaceous material according to any one of [1] to [5].

[9] An electrode for an electric double layer capacitor comprising the electrode material for an electric double layer capacitor according to [8].

[10] An electric double layer capacitor comprising the electrode for an electric double layer capacitor according to [9].

Effect of the Invention

The present invention can provide the carbonaceous material used for an electric double layer capacitor having a high electrostatic capacity and capable of maintaining the high electrostatic capacity and energy density over a long period and a method for producing the same.

MODES FOR CARRYING OUT THE INVENTION

A carbonaceous material according to an embodiment of the present invention has a specific surface area of 1,800 $m^2/g$ to 3,000 $m^2/g$ according to a BET method, an R-value of 1.2 or more and a G-band half-value width of 70 $cm^{-1}$ or more according to a Raman spectrum. In the present invention, the carbonaceous material means a product obtained by a high-temperature halogen-compound treatment of activated carbon subjected to an activation treatment.

The carbonaceous material according to an embodiment of the present invention can be produced by, for example, a method comprising a high-temperature halogen-compound treatment step of heat-treating an activated carbon having an average particle diameter of 100 μm to 10,000 μm and a specific surface area of 1,600 m$^2$/g to 3,000 m$^2$/g according to a BET method at 500° C. to 1,250° C. in an inert gas atmosphere containing a halogen compound.

The carbonaceous material can also be produced by a method comprising an impregnation step of impregnating an activated carbon having an average particle diameter of 100 to 10,000 μm and a specific surface area of 1,600 m$^2$/g to 3,000 m$^2$/g according to a BET method with an alkali metal hydroxide to obtain an alkali metal hydroxide-impregnated activated carbon, and a high-temperature halogen-compound treatment step of heat-treating the alkali metal hydroxide-impregnated activated carbon at 500° C. to 1,250° C. in an inert gas atmosphere containing a halogen compound to obtain a carbonaceous material.

These methods enable production of a carbonaceous material used for an electric double layer capacitor having a high electrostatic capacity and capable of maintaining the high electrostatic capacity and energy density over a long period even in high-voltage drive.

The production method may comprise (1) an activation step of activating a carbonaceous precursor used as a raw material to obtain activated carbon. The activation step can usually be performed before the high-temperature halogen-compound treatment step and the impregnation step.

The production method may comprise (2) a pulverization step of pulverizing the activated carbon and/or the carbonaceous material for controlling an average particle diameter of a finally obtained carbonaceous material, and may comprise (3) a heat treatment step of heating the carbonaceous material obtained by the high-temperature halogen-compound treatment step at 500° C. to 1,250° C. in an inert gas atmosphere in the absence of a halogen compound. The pulverization step may be performed before the high-temperature halogen-compound treatment step and the impregnation step or may be performed after the high-temperature halogen-compound treatment step and the impregnation step. The heat treatment step can usually be performed after the high-temperature halogen-compound treatment step.

The carbonaceous material is made mainly from a carbonaceous precursor. The carbonaceous precursor used as a raw material of the carbonaceous material is not particularly limited as long as activated carbon is formed by activation, and may be selected widely from plant-derived carbonaceous precursors (hereinafter also referred to as "plant-derived char"), carbonaceous precursors derived from minerals, carbonaceous precursors derived from natural materials, carbonaceous precursors derived from synthetic materials, etc. In the present invention, the carbonaceous material, i.e., the carbonaceous precursor, is preferably plant-derived from the viewpoint of reducing harmful impurities, from the viewpoint of environmental protection, and from the commercial point of view.

Examples of the mineral-derived carbonaceous precursors can comprise petroleum-based and coal-based pitch and coke; examples of the carbonaceous precursors derived from natural materials can comprise carbides of natural fibers such as cotton and hemp, regenerated fibers such as rayon and viscose rayon, and semisynthetic fibers such as acetate and triacetate; and examples of the carbonaceous precursors derived from synthetic materials can comprise carbides of polyamide based resin such as nylon, polyvinyl alcohol based resin such as vinylon, polyacrylonitrile based resin such as acrylic, polyolefin based resin such as polyethylene and polypropylene, polyurethane, phenol based resin, vinyl chloride based resin, etc.

Plants used as raw materials for the plant-derived char (carbonaceous precursor) are not particularly limited, and examples comprise coconut shells, coffee beans, tea leaves, sugarcane, fruits (e.g., mandarin oranges, bananas), straws, hardwoods, conifers, bamboo, or ricehusk. These plants can be used alone or in combination of two or more kinds, and particularly, coconut shells are preferable due to easy availability in large amount and industrial advantages. The palm used as raw materials for the coconut shell is not particularly limited, and may be, for example, palm trees (oil palm), coconut trees, Salak, or double coconuts. The coconut shells obtained from these palms can be used alone or in combination, and coconut shells of coconut trees and palm trees are biomass waste generated in a large amount after being used for food, detergent raw material, biodiesel oil raw material, etc., and are particularly preferably. In the present invention, these plants can be obtained in the form of char (e.g., coconut shell char) after pre-firing, which is preferably used as the raw material. Char generally refers to powdery solid rich in carbon generated without melting/softening when coal is heated; however, in this description, the char also refers to powdery solid rich in carbon generated without melting/softening by heating an organic substance.

Although a method for producing a char from a plant is not particularly limited, for example, the plant raw material is subjected to a heat treatment (carbonization treatment) under an inert gas atmosphere at 300° C. or higher for the production.

The carbonaceous precursor preferably has a BET specific surface area of 100 m$^2$/g to 800 m$^2$/g, more preferably 200 m$^2$/g to 700 m$^2$/g, and further preferably 300 m$^2$/g to 600 m$^2$/g. When the BET specific surface area of the carbonaceous precursor is within the range, the electric double layer capacitor comprising the obtained carbonaceous material can maintain higher electrostatic capacity and energy density over a long period. The BET specific surface area can be calculated by a nitrogen adsorption method, and can be calculated by, for example, a method described in Examples.

If the carbonaceous material is derived from plants, the carbonaceous material can be doped with a large amount of an active material and is therefore useful as an electrode material of an electric double layer capacitor, and particularly in the present invention, since a carbonaceous material having a predetermined BET specific surface area as well as an R-value and a G-band half-value width according to a Raman spectrum can easily be obtained, the carbonaceous material is very useful. However, the plant-derived char contains a large amount of metal elements, particularly potassium (e.g., about 0.3% in coconut shell char). Additionally, when a carbonaceous material produced from the plant-derived char containing a large amount of a metal element such as iron (e.g., about 0.1% of iron element in coconut shell char) is used as a carbon electrode material, the electrochemical characteristics and safety are adversely affected. Therefore, the contents of the potassium element, the iron element, etc. contained in the carbonaceous material are preferably reduced as much as possible. Preferable contents of the potassium element and the iron element in the carbonaceous material will be described later.

The plant-derived char also contains alkali metals (e.g., sodium) other than potassium, alkaline earth metals (e.g., magnesium, calcium), transition metals (e.g., iron, copper), and other elements, and the contents of these metals are preferably reduced. This is because if these metals are contained, impurities are eluted into an electrolytic solution when a voltage is applied to an electrode, which may adversely affect battery performance and safety.

[Activation Step]

An activation treatment is a treatment of forming pores on a surface of a carbonaceous precursor to increase a BET specific surface area and a pore volume. Such an activation treatment is a treatment of activating the carbonaceous precursor by using an activator to obtain activated carbon. A known activation treatment is (1) chemical activation for producing activated carbon by heating a mixture of an activator and a carbonaceous precursor under an inert gas atmosphere or (2) gas activation for producing activated carbon by heating a carbonaceous precursor in the presence of an activation gas (activator) such as water vapor, carbon dioxide, air, and combustion gas. From the viewpoint of a large BET specific surface area of activated carbon and easiness of adjustment of a pore volume, the gas activation is preferably adopted as the activation treatment for the plant-derived carbonaceous precursor. If water vapor is present, a water vapor partial pressure in the activation gas is, for example, 20 to 60%, preferably 25 to 50%, more preferably 30 to 40%.

For the activation gas (activator) used in the gas activation, gas such as water vapor, carbon dioxide, air, and combustion gas (kerosene combustion gas [mixed gas of $H_2O$, $CO_2$, CO, and $N_2$]) can be used alone or as a mixture or can be mixed with an inert gas such as nitrogen etc., and the combustion gas is preferably used. Therefore, a production method preferably comprises the activation step of activating a carbonaceous precursor by using the combustion gas as the activation gas to obtain activated carbon. By using the combustion gas as the activator, the BET specific surface area of activated carbon can easily be increased, and the pore volume can be adjusted in the plant-derived carbonaceous precursor. Since the activated carbon obtained by the gas activation contains a large amount of amorphous carbon and is easily oxidized even during cooling, easily decomposable acidic functional groups are generated in a larger amount in the activated carbon obtained by performing the activation treatment. Therefore, in terms of more remarkable implementation of the effects of the present invention, i.e., the high electrostatic capacity achieved by reducing an amount of acidic functional groups present in the activated carbon and the maintenance of the high electrostatic capacity and energy density over a long period, the activated carbon used in the present invention is preferably obtained by activation treatment with the combustion gas.

The heating in the gas activation is preferably performed at a heating temperature of about 500° C. to 900° C. The BET specific surface area and the average pore diameter of the activated carbon tend to decrease when the heating temperature is low and tend to increase when the heating temperature is high. The treatment time for gas activation is usually about 100 to 500 minutes, and preferably 110 to 300 minutes. If the treatment time is less than 100 minutes, a specific surface area sufficient for providing the effects of the present invention may not be obtained, and if the treatment time exceeds 500 minutes, the mechanical strength of the obtained activated carbon particles may significantly be reduced.

To control an average particle diameter of a finally obtained carbonaceous material, a pulverization step of pulverizing the activated carbon obtained by the activation step may be comprised. Additionally, the pulverization step preferably comprises classification. The average particle diameter can more precisely be adjusted by classification. For a method of pulverization and classification, a method described later is usable.

[Impregnation Step]

In the method of producing the carbonaceous material according to the embodiment of the present invention, the impregnation step is a step of impregnating the activated carbon (preferably the plant-derived activated carbon) having the average particle diameter and the BET specific surface area described above with an alkali metal hydroxide and can be performed by adding and mixing an alkali metal hydroxide with the activated carbon used as a raw material. The impregnation with the alkali metal hydroxide can promote dehydrogenation and deoxygenation functional group in a heat treatment in the high-temperature halogen-compound treatment step described later and a subsequent heat treatment step.

Examples of the alkali metal hydroxide usable for the impregnation step include lithium hydroxide, sodium hydroxide, potassium hydroxide, and cesium hydroxide. Sodium hydroxide and potassium hydroxide are preferable in consideration of economy and operability, and sodium hydroxide is more preferable from the viewpoint of a specific surface area reduction suppression effect. These alkali metal hydroxides may be either anhydrides or hydrates, and only one type may be used alone, or two or more types may be mixed and used.

An amount of the alkali metal hydroxide to be used is not particularly limited and may appropriately be determined depending on a type of the alkali metal hydroxide to be used, physical properties and characteristics of the raw-material activated carbon, etc. To more clearly produce the effect at the impregnation step, the alkali metal hydroxide is usually preferably used in the range of 1 to 50 mass % relative to 100 mass % of the raw-material activated carbon. At the impregnation step, in consideration of economy and mechanical strength of the obtained carbonaceous material, the alkali metal hydroxide is used more preferably in the range of 2 to 20 mass %, further preferably in the range of 5 to 10 mass %, relative to 100 mass % of the raw-material activated carbon.

A method of impregnation with the alkali metal hydroxide is not particularly limited, and examples thereof may include a method in which the raw-material activated carbon is added to and immersed in a mixture, in which the alkali metal hydroxide is dissolved in water or alcohol such as methanol and ethanol, and then, the solvent is removed. The treatment temperature and the treatment time at this impregnation step are not particularly limited and may appropriately be determined depending on a type of the alkali metal hydroxide and solvent to be used, a concentration of solution, etc. For example, if the treatment temperature is too low, the viscosity of the mixture of the alkali metal hydroxide and the raw-material activated carbon tends to increase, and the diffusion of the alkali metal hydroxide becomes insufficient, so that the specific surface area reduction suppression effect and the promoting effect for the dehydrogenation and deoxygenation functional groups may not sufficiently be obtained. If the treatment time is too short, the diffusion of the alkali metal hydroxide becomes insufficient, so that the specific surface area reduction suppression effect and the promoting effect for the dehydrogenation and deoxygenation functional groups may not sufficiently be obtained. In an embodiment of the present invention, the treatment temperature of the impregnation step is usually 10° C. or higher, preferably about 15 to 80° C., and the treatment time is usually about 10 to 180 minutes.

In addition, the examples of the method include a method in which the alkali metal hydroxide and the raw-material activated carbon may be mixed in a solid state and then heated to about 300° C., so that the alkali metal hydroxide is allowed to deliquesce and adsorbed by the raw-material activated carbon. The activated carbon impregnated with the alkali metal hydroxide obtained by these methods (also referred to as "alkali metal hydroxide-impregnated activated carbon") can directly be used in the high-temperature halogen-compound treatment step described later.

The average particle diameter of the activated carbon used at the impregnation step is not particularly limited. However, an excessively small average particle diameter makes it difficult to separate the gas phase containing removed potassium etc. and the generated carbonaceous material at the subsequently performed high-temperature halogen-compound treatment step, and therefore, a lower limit of the average particle diameter is preferably 100 µm or more, more preferably 200 µm or more, and further preferably 300 µm or more. An upper limit of the average particle diameter of the activated carbon is preferably 10,000 µm or less, more preferably 8,000 µm or less, further preferably 5,000 µm or less, particularly preferably 4,000 µm or less, for example, 3,000 µm or less.

The BET specific surface area of the activated carbon used at the impregnation step is preferably 1,600 $m^2/g$ or more, more preferably 1,800 $m^2/g$ or more, further preferably 2,000 $m^2/g$ or more, and is preferably 3,000 $m^2/g$ or less, more preferably 2,800 $m^2/g$ or less.

The pore volume of the activated carbon used at the impregnation step is preferably 0.5 mL/g or more, more preferably 0.7 mL/g or more, further preferably 1.0 mL/g or more, and is preferably 3.4 mL/g or less, more preferably 2.0 mL/g or less, further preferably 1.5 mL/g or less.

[High-Temperature Halogen-Compound Treatment Step]

In the present invention, the high-temperature halogen-compound treatment step is a heat treatment of the activated carbon or the alkali metal hydroxide-impregnated activated carbon having the average particle diameter and the BET specific surface area described above at 500° C. to 1,250° C. in an inert gas atmosphere containing a halogen compound to obtain a carbonaceous material and can provide a demineralization treatment. This high-temperature halogen-compound treatment enables efficient removal of the potassium element, the iron element, etc. precipitated on an electrode surface and possibly causing a short circuit when the activated carbon is used as an electrode material for an electric double layer capacitor; and particularly, the iron element can efficiently be removed as compared to usually performed liquid-phase demineralization. The step also enables removal of other alkali metals, alkaline earth metals, and even transition metals such as copper and nickel. Additionally, in the high-temperature halogen-compound treatment step, contact of the activated carbon with the halogen compound causes the halogen compound to react with oxygen functional groups on a activated carbon surface to remove the oxygen functional groups while reacting with surrounding carbon, so that a degree of crystallinity of the generated carbonaceous material is improved (R-value of Raman spectrum is increased), which reduces starting points of reaction with the electrolytic solution, and the stability is improved when a working voltage is increased. The method for producing a carbonaceous material according to an embodiment of the present invention preferably comprises the high-temperature halogen-compound treatment step after the activation step of activating a carbonaceous precursor by using the combustion gas as the activation gas to obtain activated carbon. The electric double layer capacitor containing the carbonaceous material obtained in this case can maintain especially high electrostatic capacity and energy density over a long period even in high-voltage drive. Although the reason is not clear, this is conceivably because the activation step of activating a carbonaceous precursor by using the combustion gas as the activation gas to obtain activated carbon results in preliminary removal of a carbon structure having a low crystallinity through activation, and the subsequently performed high-temperature halogen-compound treatment step promotes formation of a crystal layer only in a remaining portion having a relatively high crystallinity.

The halogen compound contained in the inert gas used in the high-temperature halogen-compound treatment step is not particularly limited, may be at least one compound containing an element selected from the group consisting of fluorine, chlorine, and iodine, for example, or specifically may be at least one selected from the group consisting of fluorine, chlorine, bromine, iodine, hydrogen fluoride, hydrogen chloride, hydrogen bromide, iodine bromide, chlorine fluoride (ClF), iodine chloride (ICl), iodine bromide (IBr), bromine chloride (BrCl) etc., compounds from which these halogen compounds are generated by thermal decomposition, and mixtures thereof, and is preferably hydrogen chloride or hydrogen bromide, and more preferably hydrogen chloride.

The halogen compound is mixed with an inert gas when used, and the inert gas to be mixed is not particularly limited as long as the gas is not reactive with the carbonaceous material at the treatment temperature, may be nitrogen, helium, argon, krypton, or a mixed gas thereof, for example, and is preferably nitrogen. Furthermore, it is more preferable that an impurity gas, particularly oxygen, contained in the inert gas has a lower concentration, and a usually allowable oxygen concentration is preferably 0 to 2,000 ppm, more preferably 0 to 1,000 ppm.

In the high-temperature halogen-compound treatment step, a mixing ratio of the inert gas and the halogen compound is not limited as long as sufficient demineralization is achieved, and an amount of the halogen compound relative to the inert gas is preferably 0.1 to 10 vol %, more preferably 0.3 to 5 vol %, further preferably 0.4 to 4 vol %, particularly preferably 0.5 to 3 vol %. Although a treatment with a hydrochloric acid solution etc. (liquid-phase demineralization treatment) is also conceivable, this is disadvantageous from an industrial point of view because a sufficient drying treatment is required. According to the present invention, since the high-temperature halogen-compound treatment is performed in an inert gas atmosphere containing a halogen compound, a drying treatment can easily be performed, which is industrially advantageous. In the present invention, the high-temperature halogen-compound treatment step performed in an inert gas atmosphere containing a halogen compound enables not only a reduction of the metal elements but also a reduction of the hydrogen element and the oxygen element at ends of carbon structures, so that active sites for carbon materials can be reduced.

The temperature of the high-temperature halogen-compound treatment is usually 500° C. to 1,250° C., preferably 550° C. or more, more preferably 600° C. or more, further preferably 650° C. or more, particularly preferably 700° C. or more, and is preferably 1,200° C. or less, more preferably 1,150° C. or less, further preferably 1,100° C. or less, particularly preferably 1,050° C. or less, extremely preferably 1,000° C. or less. In an embodiment of the present invention, the temperature of the high-temperature halogenation treatment is usually 500° C. to 1,250° C., for example, preferably 550° C. to 1,200° C., more preferably 600° C. to 1,150° C., further preferably 650° C. to 1,100° C., particularly preferably 650° C. to 1,050° C., and extremely preferably 700° C. to 1,000° C. When the temperature of the high-temperature halogen-compound treatment is less than 500° C., a demineralization efficiency in the high-temperature halogen-compound treatment decreases and may result in insufficient demineralization, and when the temperature of the high-temperature halogen-compound treatment exceeds 1,250° C., the activation effect brought by the halogen-compound can no longer be obtained, and thermal contraction makes the BET specific surface area smaller, which is not preferable.

The duration of the high-temperature halogen-compound treatment is not particularly limited and is preferably 5 minutes to 300 minutes, more preferably 10 minutes to 200 minutes, and further preferably 30 minutes to 150 minutes.

The high-temperature halogen-compound treatment step in the present invention is a step for removing the metal elements, particularly potassium and iron, contained in activated carbon. A potassium element content after the high-temperature halogen-compound treatment step is preferably 0.1 mass % or less, more preferably 0.05 mass % or less, further preferably 0.03 mass % or less. An iron element content is preferably 0.02 mass % or less, more preferably 0.015 mass % or less, more preferably 0.01 mass % or less, and further preferably 0.005 mass % or less. When the potassium element content exceeds 0.1 mass % and/or the iron element content exceeds 0.02 mass %, an electric double layer capacitor using the obtained carbonaceous material, i.e., an electric double layer capacitor containing the carbonaceous material, is subjected to electrical reduction due to generation of potassium-derived electrolyte, resulting in precipitation and short-circuiting on a separator or an electrode surface, which may cause a significant safety problem.

Although a mechanism capable of efficiently removing potassium, other alkali metals, alkaline earth metals, transition metals, etc. by the high-temperature halogen-compound treatment step in the present invention is not clear, a conceivable reason is as follows. Metals such as potassium contained in the plant-derived char react with the halogen compound diffused in the char and form a metal halide (e.g., chloride or bromide). It is thought that potassium and iron can be demineralized through volatilization (dissipation) of the generated metal halide by heating. It is believed that such a mechanism of generation of metal halide through diffusion and reaction of the halogen compound in char can efficiently remove potassium and iron as compared to liquid-phase demineralization due to high diffusion of the halogen compound in the gas phase; however, the present invention is not limited to the above description.

The average particle diameter of the activated carbon used for the high-temperature halogen-compound treatment, i.e., the activated carbon obtained by the activation step or the alkali metal hydroxide-impregnated activated carbon, is not particularly limited. However, if the average particle diameter is excessively small, it is difficult to separate the gas phase containing removed potassium etc. and the generated carbonaceous material, and therefore, a lower limit of the average particle diameter is preferably 100 μm or more, more preferably 200 μm or more, and further preferably 300 μm or more. An upper limit of the average particle diameter of the activated carbon is preferably 10,000 μm or less, more preferably 8,000 μm or less, further preferably 5,000 μm or less, particularly preferably 4,000 μm or less, for example, 3,000 μm or less. In the present invention, the average particle diameter can be measured by a laser scattering method, for example.

An apparatus used for the high-temperature halogen-compound treatment is not particularly limited as long as the apparatus is capable of heating while mixing the activated carbon (alkali metal hydroxide-impregnated activated carbon) and the mixed gas of an inert gas and a halogen compound and, for example, a fluidized furnace can be used for performing the treatment with an intra-layer flow system of a continuous type with a fluidized bed etc. or a batch type. A supply amount (flow rate) of the mixed gas is not limited and is usually 1 mL/min or more, preferably 5 mL/min or more, more preferably 10 mL/min or more, further preferably 30 mL/min or more, particularly preferably 50 mL/min or more, especially preferably 70 mL/min or more, extremely preferably 90 mL/min or more, for example, 100 mL/min or more, per 1 g of activated carbon. The supply amount (flow rate) of the mixed gas is usually 2,000 mL/min or less from the viewpoint of maintaining the treatment temperature.

The BET specific surface area of the activated carbon (alkali metal hydroxide-impregnated activated carbon) used at the high-temperature halogen-compound treatment step, i.e., the activated carbon obtained by the activation step, is preferably 1,600 $m^2/g$ or more, more preferably 1,800 $m^2/g$ or more, further preferably 2,000 $m^2/g$ or more, and is preferably 3,000 $m^2/g$ or less, more preferably 2,800 $m^2/g$ or less. In the present invention, the BET specific surface area can be calculated by a nitrogen adsorption method, and can be calculated by, for example, a method described in Examples.

The pore volume of the activated carbon (alkali metal hydroxide-impregnated activated carbon) used at the high-temperature halogen-compound treatment step, i.e., the activated carbon obtained by the activation step, is preferably 0.5 mL/g or more, more preferably 0.7 mL/g or more, further preferably 1.0 mL/g or more, and is preferably 3.4 mL/g or less, more preferably 2.0 mL/g or less, further preferably 1.5 mL/g or less. In the present invention, the pore volume can be calculated by a nitrogen adsorption method, and can be calculated by, for example, a method described in Examples.

[Heat Treatment Step]

In the present invention, the high-temperature halogen-compound treatment step in an inert gas atmosphere containing a halogen compound is preferably followed by a heat treatment step of heating the carbonaceous material obtained by the high-temperature halogen-compound treatment step in an inert gas atmosphere in the absence of a halogen compound. The contact with the halogen compound in the high-temperature halogen-compound treatment enables efficient removal of the metal elements such as the iron element. However, by the contact with the halogen compound, halogens are contained in the carbonaceous material. Therefore, the heat treatment in the absence of a halogen compound is preferably performed, and the halogens contained in the carbonaceous material can be removed by this treatment. Specifically, the heat treatment in the absence of a halogen compound is usually performed as a heat treatment at 500° C. to 1250° C. in an inert gas atmosphere without a halogen compound, or the heat treatment in the absence of a halogen compound is preferably performed at a temperature equal to or higher than the temperature in the high-temperature halogen-compound treatment step. The temperature of the heat treatment step is preferably 500° C. to 1,250° C., more preferably 550° C. to 1,200° C., further preferably 600° C. to 1,150° C., furthermore preferably 650° C. to 1,100° C., particularly preferably 650° C. to 1,050° C., extremely preferably 700° C. to 1,000° C. For example, after the heat treatment in an inert gas atmosphere containing a halogen compound (the high-temperature halogen-compound treatment step), the supply of the halogen compound can be interrupted and the heat treatment can be continuously performed so that the heat treatment in the absence of a halogen compound can be performed, and the halogens in the carbonaceous material can thereby be removed. Although not particularly limited, the duration of the heat treatment in the absence of a halogen compound is preferably 5 minutes to 300 minutes, more preferably 10 minutes to 200 minutes, further preferably 10 minutes to 150 minutes, and most preferably 10 minutes to 100 minutes. Examples of the inert gas include a gas used in the high-temperature halogen-compound treatment step. From the viewpoint that a production process can be simplified, the inert gas in the heat treatment step is preferably the same as the inert gas in the high-temperature halogen-compound treatment step. A supply amount (flow rate) of the inert gas is not limited and is usually 1 mL/min or more, preferably 5 mL/min or more, more preferably 10 mL/min or more, further preferably 50 mL/min or more, particularly preferably 100 ml/min or more, per 1 g of activated carbon. The supply amount (flow rate) of the mixed gas is usually 2,000 mL/min or less.

[Pulverization Step]

In the present invention, the pulverization step is a pulverization step of pulverizing the carbonaceous material obtained at the high-temperature halogen-compound treatment step or the heat treatment step and is a step of pulverizing the carbonaceous material after removal of the contained metal components to an average particle diameter of 2 to 30 μm. Therefore, the average particle diameter of the obtained carbonaceous material is adjusted by the pulverization step to 2 to 30 μm, for example. Preferably, the pulverization step further comprises classification. The average particle diameter can more precisely be adjusted by classification.

A pulverizer used for pulverization is not particularly limited and, for example, a bead mill, a jet mill, a ball mill, a hammer mill, or a rod mill can be used alone or in combination, and in view of less generation of fine powder, a jet mill having a classification function is preferable. On the other hand, in the case of using a ball mill, a hammer mill, a rod mill etc., fine powder can be removed by performing classification after pulverization.

(Classification)

Examples of classification can comprise classification using a sieve, wet classification, or dry classification. Examples of wet classifiers can comprise classifiers utilizing principles of gravity classification, inertia classification, hydraulic classification, or centrifugal classification. Examples of dry classifiers can comprise classifiers utilizing principles of sedimentation classification, mechanical classification, or centrifugal classification.

At the pulverization step, pulverization and classification can also be performed by using one apparatus. For example, pulverization and classification can be performed by using a jet mill having a dry classification function. Alternatively, a pulverizer and a classifier can be separated in an apparatus to be used. In this case, pulverization and classification can continuously be performed, or pulverization and classification can discontinuously be performed.

[Average Particle Diameter]

The average particle diameter (D50) of the carbonaceous material according to an embodiment of the present invention is preferably 2 to 30 μm. An average particle diameter less than 2 μm increases fine powder and increases viscosity of paste at the time of fabrication of an electrode, resulting in a reduction in electrode fabrication efficiency, which is not favorable. Additionally, when an electrode is produced by using the obtained carbonaceous material, each of voids formed in the carbonaceous material becomes smaller, and an electrolyte in an electrolytic solution may be restricted from moving. The average particle diameter of the carbonaceous material is preferably 2 μm or more, more preferably 2.1 μm or more, further preferably 2.5 μm or more, particularly preferably 3 μm or more. On the other hand, when the average particle diameter of the carbonaceous material is 30 μm or less, surface areas of particles attribute to a capacity, which enables a high electrostatic capacity and rapid charge and discharge. Furthermore, in the electric double layer capacitor, it is important to increase an electrode area for improvement of input/output characteristics, and therefore, a coating thickness of an active material applied to a collector plate needs to be reduced at the time of electrode preparation. To reduce the coating thickness, it is necessary to reduce the particle diameter of the active material. From such a viewpoint, the upper limit of the average particle diameter is preferably 30 μm or less, more preferably 19 μm or less, further preferably 17 μm or less, furthermore preferably 16 μm or less, most preferably 15 μm or less. D50 is the particle diameter at which the cumulative volume is 50%, and this value can be used as the average particle diameter and, for example, a laser scattering method can be performed by using a particle size distribution measuring device (e.g., "SALD-3000S" manufactured by Shimadzu Corporation, "Microtrac MT3000" manufactured by Nikkiso).

[BET Specific Surface Area]

A specific surface area according to a BET method (also referred to as "BET specific surface area") of the carbonaceous material according to an embodiment of the present invention is 1,800 $m^2/g$ or more, preferably higher than 1,800 $m^2/g$, more preferably 1,850 $m^2/g$ or more, further preferably 1,900 $m^2/g$ or more, particularly preferably 2,000 $m^2/g$ or more, extremely preferably higher than 2,000 $m^2/g$, for example, 2,010 $m^2/g$ or more, and is 3,000 $m^2/g$ or less, preferably 2800 $m^2/g$ or less, more preferably 2,500 $m^2/g$ or less. When the BET specific surface area exceeds 3,000 $m^2/g$, an electrolyte absorption amount per weight increases; however, a reduction in capacity per volume may result in a deterioration of performance of the electric double layer capacitor. When the BET specific surface area is less than 1,800 $m^2/g$, a decrease in the pore volume leads to reductions of retention rates of electrostatic capacity and energy density in long-term use in high-voltage drive at 3 V or more. When the BET specific surface area of the carbonaceous material according to an embodiment of the present invention is within the range, the electric double layer capacitor containing the carbonaceous material can maintain higher electrostatic capacity and energy density over a long period even in high-voltage drive.

[Raman Spectrum]

The carbonaceous material according to an embodiment of the present invention has an intensity ratio (R-value=$I_D/I_G$) of 1.2 or more between a peak intensity ($I_D$) near 1360 $cm^{-1}$ and a peak intensity ($I_G$) near 1580 $cm^{-1}$ of the Raman spectrum observed by laser Raman spectroscopy. The peak near 1360 $cm^{-1}$ is a Raman peak generally called a D band, which is a peak attributable to disturbance/defect of the graphite structure. The peak near 1580 $cm^{-1}$ is a Raman peak generally called a G band, which is a peak attributable to a graphite structure. The peak near 1,360 $cm^{-1}$ is usually observed in a range of 1345 $cm^{-1}$ to 1375 $cm^{-1}$, preferably 1350 $cm^{-1}$ to 1370 $cm^{-1}$. The peak near 1,580 $cm^{-1}$ is usually observed in a range of 1560 $cm^{-1}$ to 1615 $cm^{-1}$, preferably 1565 $cm^{-1}$ to 1610 $cm^{-1}$.

The R-value is the intensity ratio of these peaks and is related to the crystallinity of the carbonaceous material. If the crystallinity of the carbonaceous material is too high, the development of the graphite structure decreases carbon edges so that the coordination sites of the electrolyte are reduced. This causes problems such as a deterioration in characteristics at low temperature and an increase in resistance. If the crystallinity of the carbonaceous material is too low, an amorphous material is increased so that the electric resistance becomes higher. Therefore, the electric double layer is reduced in utilization efficiency of an interface between the electrolyte and an electrode material. From the above viewpoint, the R-value is 1.2 or more, more preferably 1.25 or more, further preferably 1.30 or more. From the viewpoint of affinity for electrolytic solution, the R-value is preferably 1.6 or less, more preferably 1.55 or less, further preferably 1.5 or less, particularly preferably 1.45 or less, extremely preferably 1.40 or less. When the R-value is in the range, the electric double layer capacitor containing the carbonaceous material can maintain higher electrostatic capacity and energy density over a long period even in high-voltage drive.

The G-band half-value width is related to an amount of disturbance/defect of the graphite structure contained in the carbonaceous material. If the half-value width is too low, the disturbance/defect of the graphite structure contained in the carbonaceous material is too small, and the development of the graphite structure decreases carbon edges so that the coordination sites of the electrolyte are reduced, which causes problems such as a deterioration in characteristics at low temperature and an increase in resistance. On the other hand, if the half-value width is too large, the disturbance/defect of the graphite structure contained in the carbonaceous material becomes larger, and an amorphous material is increased so that the resistance becomes higher. From the above viewpoint, the half-value width of the peak near 1580 $cm^{-1}$ (the G-band half width) is 70 $cm^{-1}$ or more, preferably 71 $cm^{-1}$ or more, more preferably 71.5 $cm^{-1}$ or more, further preferably 72 $cm^{-1}$ or more. The G-band half-value width is preferably 86 $cm^{-1}$ or less, more preferably 85 $cm^{-1}$ or less, further preferably 84 $cm^{-1}$ or less, particularly preferably 83 $cm^{-1}$ or less, extremely preferably 82 $cm^{-1}$ or less, especially preferably 81 $cm^{-1}$ or less. When the G-band half-value width is within the range, the electric double layer capacitor containing the carbonaceous material can maintain higher electrostatic capacity and energy density over a long period even in high-voltage drive.

[Metal Elements]

Examples of the metal elements possibly contained in the carbonaceous material according to an embodiment of the present invention include alkali metals (e.g., sodium), alkaline earth metals (e.g., magnesium or calcium), and transition metals (e.g., iron and copper).

In an embodiment of the present invention, the potassium element content contained in the carbonaceous material is preferably 1,000 ppm or less, more preferably 500 ppm or less, further preferably 300 ppm or less, particularly preferably 250 ppm or less, extremely preferably 200 ppm or less, especially preferably 100 ppm or less, for example, 50 ppm or less. The iron element content contained in the carbonaceous material is preferably 200 ppm or less, more preferably 150 ppm or less, further preferably 100 ppm or less, particularly preferably 60 ppm or less, extremely preferably 40 ppm or less, for example, 30 ppm or less. The potassium element content and the iron element content contained in the carbonaceous material are each usually 0 ppm or more. When the content of the potassium element and/or the iron element in the carbonaceous material is not more than the upper limit value, the influence of the metal elements on the electrochemical characteristics and safety can be reduced in the case that the carbonaceous material is used as the electrode material. If the contents of the potassium element and the iron element are low, the contents of the other metal elements also tend to be low. The contents of the potassium element and the iron element can be measured by X-ray fluorescent analysis, for example.

[Hydrogen Element]

In the carbonaceous material according to an embodiment of the present invention, the content of the hydrogen element is preferably 0.47 mass % or less, more preferably 0.42 mass % or less, further preferably 0.415 mass % or less, particularly preferably 0.41 mass % or less, extremely preferably 0.405 mass % or less, especially preferably 0.4 mass % or less. When the content of the hydrogen element in the carbonaceous material is not more than the upper limit value, the reactivity with the electrolyte is reduced, and a stable carbonaceous material can be obtained. The lower limit of the content of the hydrogen element in the carbonaceous material is usually 0.1 mass % or more. The content of the hydrogen element can be measured by an inert gas dissolving method, for example.

[Pore Volume]

In the carbonaceous material according to an embodiment of the present invention, a pore volume is preferably 0.8 to 1.5 mL/g, more preferably 0.85 to 1.4 mL/g, further preferably 0.9 to 1.3 mL/g, particularly preferably 0.95 to 1.2 mL/g. When the pore volume of the carbonaceous material is within the range, sufficient mechanical strength can be maintained along with high electrostatic capacity and energy density for an electrode for an electric double layer capacitor over a long period.

The carbonaceous material according to an embodiment of the present invention can suitably be used as an electrode material for an electric double layer capacitor. An embodiment of the present invention can provide an electrode material for an electric double layer capacitor containing the carbonaceous material and can further provide an electrode for an electric double layer capacitor containing the electrode material, and an electric double layer capacitor containing the electrode. Known production methods can be used for producing these electrodes and capacitors. In the present invention, it is not necessary to perform the production methods in a completely dehumidified state like the electric double layer capacitor described in Patent Document 1, so that the carbonaceous material can practically be used. Furthermore, the carbonaceous material according to an embodiment of the preset invention has a very low resistance value and is therefore also useful as a material for electrostatic removal, a conductive material, etc.

In the electric double layer capacitor fabricated by using the carbonaceous material according to an embodiment of the present invention, the decrease in the BET specific surface area and the pore volume of the carbonaceous material due to the heat treatment is suppressed as much as possible, and therefore, an initial electrostatic capacity can be increased. Additionally, since an amount of the acidic functional groups present in the carbonaceous material is effectively reduced, a decrease in electrostatic capacity due to long-term use can also be kept low. Furthermore, the electric double layer capacitor obtained by using the carbonaceous material has a small content of the hydrogen element serving as a reaction point with the electrolytic solution and therefore can provide an effect of suppressing the reduction in electrostatic capacity due to long-term use to a low level even under a high voltage condition (e.g., 3 V or more), and the voltage can be made higher, which is effective for improving the energy density.

Examples of the electrode for an electric double layer capacitor comprise those obtained by kneading a carbonaceous material that is an electrode material, a conductivity imparting agent, and a binder, adding a solvent to prepare a paste, applying the paste to a collector plate such as an aluminum foil, and then removing the solvent by drying, or putting the paste into a mold for press forming.

The binder used for this electrode can be polytetrafluoroethylene, a fluorinated polymer compound such as polyvinylidene fluoride, carboxymethyl cellulose, styrene-butadiene rubber, petroleum pitch, a phenol resin, etc. The conductivity imparting agent can be acetylene black, Ketjen black etc.

The electric double layer capacitor generally has a structure mainly made up of electrodes, an electrolytic solution, and a separator such that the separator is disposed between paired electrodes. Examples of the electrolytic solution include an electrolytic solution in which an amidine salt is dissolved in an organic solvent such as propylene carbonate, ethylene carbonate, and methylethyl carbonate, an electrolytic solution in which a quaternary ammonium salt of perchloric acid is dissolved, an electrolytic solution in which tetrafluoroborate or hexafluorophosphate of quaternary ammonium or alkali metal such as lithium is dissolved, and an electrolytic solution in which a quaternary phosphonium salt is dissolved. Examples of the separator comprise cellulose, glass fiber, or nonwoven fabric, cloth, and microporous film mainly composed of polyolefin such as polyethylene and polypropylene.

EXAMPLES

The present invention will hereinafter specifically be described with examples; however, the present invention is not limited to these examples.

A method for measuring physical property values of the carbonaceous precursor, the carbonaceous material, and the activated carbon will hereinafter be described; however, the physical property values described in this description comprising the examples are based on values obtained by the following method.

[Measurement of BET Specific Surface Area]

The specific surface area was obtained by a BET method of measuring a nitrogen adsorption isotherm of a sample by using the nitrogen adsorption amount measuring apparatus BELSORP-MAX, manufactured by MicrotracBEL.

[Pore Volume]

A pore volume was obtained by a BET method of measuring a nitrogen adsorption amount up to a relative pressure $P/P_0$ (P: adsorbate gas pressure in adsorption equilibrium, $P_0$: saturated vapor pressure of adsorbate at adsorption temperature) of 0.93 by using the nitrogen adsorption amount measuring apparatus BELSORP-MAX, manufactured by MicrotracBEL.

[Elemental Analysis]

Elemental analysis was performed by using the oxygen/nitrogen/hydrogen analyzer EMGA-930 manufactured by HORIBA, Ltd.

The detection methods of the apparatus are oxygen: inert gas fusion-non-dispersive infrared absorption method (NDIR), nitrogen: inert gas fusion-thermal conductivity method (TCD), and hydrogen: inert gas fusion-non-dispersive infrared absorption method (NDIR) calibrated with an (oxygen/nitrogen) Ni capsule, $TiH_2$ (H standard sample), and SS-3 (N, O standard sample), and 20 mg of a sample having moisture content measured at 250° C. for about 10 minutes for a pretreatment was put into an Ni capsule and measured after 30 seconds of degasification in the element analyzer. The test was performed by analyzing three specimens, and an average value was used as an analysis value.

[Raman Spectrum]

The Raman spectrum was measured by using LabRAM ARAMIS manufactured by HORIBA, Ltd. with a light source having a laser wavelength of 532 nm. The test was performed by randomly sampling three particles for each sample and measuring two positions in each of the sampled particles. The measurement conditions were a wavelength range of 50 to 2000 $cm^{-1}$ and an accumulation number of 1000, and an average value of six positions in total was calculated as a measurement value. The G-band half-value width was measured after fitting peak separation between the D band (near 1360 $cm^{-1}$) and the G band (near 1590 $cm^{-1}$) with a Gauss function to the spectrum obtained under the measurement conditions. The R-value was defined as the intensity ratio $I_D/I_G$ (D-band peak intensity/G-band peak intensity) of the peaks of the D band and G band.

[Measurement of Average Particle Diameter]

An average particle diameter (particle size distribution) of a sample was measured by a laser scattering method as follows. The sample was put into an aqueous solution containing 0.3 mass % surfactant ("Toriton X100" manufactured by Wako Pure Chemical Industries), treated by an ultrasonic cleaner for 10 minutes or more, and dispersed in the aqueous solution. The particle size distribution was measured by using this dispersion. Particle size distribution measurement was performed by using a particle diameter/particle size distribution measuring device ("Microtrac MT3000" manufactured by Nikkiso). D50 is the particle diameter at which the cumulative volume is 50%, and this value was used as the average particle diameter.

[Measurement of Metal Element Content]

Regarding a method for measuring potassium element content and iron element content, the following method was used for the measurement. A carbon sample containing predetermined amounts of the potassium element and the iron element was prepared in advance to create calibration curves for a relation between the potassium Kα ray intensity and the potassium element content and a relation between the iron Kα ray intensity and the iron element content by using a X-ray fluorescent analysis device. Then, the intensities of the potassium Kα ray and the iron Kα ray in X-ray fluorescent analysis of the sample were measured to obtain the potassium element content and the iron element content from the calibration curves created in advance. The X-ray fluorescent analysis was performed by using LAB CENTER XRF-1700 manufactured by Shimadzu Corporation under the following conditions. A holder for an upper irradiation method was used and a sample measurement area was set within a circumference of 20 mm in diameter. For setting a sample to be measured, 0.5 g of the sample to be measured was placed in a polyethylene container having an inner diameter of 25 mm with the back pressed by a plankton net and a measurement surface covered with polypropylene film when measurement was performed. The X-ray source was set to 40 kV and 60 mA. Potassium was measured by using LiF (200) as a dispersive crystal and a gas flow type proportional counter tube as a detector in the range of 2θ of 90 to 140° at a scanning speed of 8°/min. Iron was measured by using LiF (200) as a dispersive crystal and a scintillation counter as a detector in the range of 2θ of 56° to 60° at a scanning speed of 8°/min.

Production Example 1

A carbonaceous precursor derived from coconut shell and having a BET specific surface area of 500 $m^2/g$ was steam-activated for 120 minutes at 900° C. in an activation gas adjusted to 35% water vapor partial pressure by supplying steam to a kerosene combustion gas (mixed gas of $H_2O$, $CO_2$, CO, and $N_2$) to prepare raw-material activated carbon derived from coconut shell. The raw-material activated carbon derived from coconut shell was pulverized to obtain coconut-shell activated carbon having an average particle diameter of 850 to 2,360 μm, a BET specific surface area of 2,100 $m^2/g$, and a pore volume of 1.1 mL/g.

Production Example 2

A carbonaceous precursor derived from coconut shell and having a BET specific surface area of 500 $m^2/g$ was steam-activated for 90 minutes at 900° C. in an activation gas adjusted to 35% water vapor partial pressure by supplying steam to a kerosene combustion gas (mixed gas of $H_2O$, $CO_2$, CO, and $N_2$) to prepare raw-material activated carbon derived from coconut shell. The raw-material activated carbon derived from coconut shell was pulverized to obtain coconut-shell activated carbon having an average particle diameter of 850 to 2,360 µm, a BET specific surface area of 1,500 m²/g, and a pore volume of 0.65 mL/g.

Example 1

To 100 g of the coconut-shell activated carbon produced in Production Example 1, a nitrogen gas (mixed gas) containing a 2 vol % hydrogen chloride gas was supplied at a flow rate of 10 L/min to perform a halogen-compound treatment at a treatment temperature of 870° C. for 50 minutes (the high-temperature halogenation treatment step). Subsequently, only the supply of the hydrogen chloride gas was stopped, and a heat treatment was further performed at a treatment temperature of 870° C. for 50 minutes (the heat treatment step) to obtain a carbonaceous material. The obtained carbonaceous material was coarsely pulverized to an average particle diameter of 8 µm with a ball mill and then pulverized and classified with a compact jet mill (Co-jet system α-mk III) to obtain a carbonaceous material (1) having an average particle diameter of 4 µm.

Example 2

A carbonaceous material (2) having an average particle diameter of 4 µm was obtained as in Example 1 except that the concentration of hydrogen chloride in the mixed gas in the halogen compound treatment was changed from 2 vol % to 4 vol %.

Example 3

A carbonaceous material (3) having an average particle diameter of 4 µm was obtained as in Example 1 except that the treatment time in the halogen compound treatment was changed from 50 minutes to 100 minutes.

Example 4

To 95 g of the coconut-shell activated carbon produced in Production Example 1, an aqueous solution of 5 g of sodium hydroxide dissolved in 100 g of ion-exchanged water was added for immersion and impregnation for 1 hour at 25° C., and then, the activated carbon was dried by a hot-air drier at 80° C. for 12 hours (impregnation step). To alkali metal hydroxide-impregnated activated carbon obtained after drying, a nitrogen gas containing a 2 vol % hydrogen chloride gas was supplied at a flow rate of 10 L/min to perform a halogen-compound treatment at a treatment temperature of 870° C. for 50 minutes (the high-temperature halogen-compound treatment step). Subsequently, only the supply of the hydrogen chloride gas was stopped, and a heat treatment was further performed at a treatment temperature of 870° C. for 50 minutes (the heat treatment step) to obtain a carbonaceous material. The obtained carbonaceous material was coarsely pulverized to an average particle diameter of 8 µm with a ball mill and then pulverized and classified with a compact jet mill (Co jet system α-mk III) to obtain a carbonaceous material (4) having an average particle diameter of 4 µm.

Example 5

To 90 g of the coconut-shell activated carbon produced in Production Example 1, an aqueous solution of 10 g of sodium hydroxide dissolved in 100 g of ion-exchanged water was added for immersion and impregnation for 1 hour at 25° C., and then, the activated carbon was dried by a hot-air drier at 80° C. for 12 hours (impregnation step). To alkali metal hydroxide-impregnated activated carbon obtained after drying, a nitrogen gas containing a 2 vol % hydrogen chloride gas was supplied at a flow rate of 10 L/min to perform a treatment at a treatment temperature of 870° C. for 50 minutes (the high-temperature halogen-compound treatment step). Subsequently, only the supply of the hydrogen chloride gas was stopped, and a heat treatment was further performed at a treatment temperature of 870° C. for 50 minutes (the heat treatment step) to obtain a carbonaceous material. The obtained carbonaceous material was coarsely pulverized to an average particle diameter of 8 µm with a ball mill and then pulverized and classified with a compact jet mill (Co jet system α-mk III) to obtain a carbonaceous material (5) having an average particle diameter of 4 µm.

Comparative Example 1

A carbonaceous material (6) having an average particle diameter of 4 µm was obtained as in Example 1 except that the coconut-shell activated carbon produced in Production Example 2 was used instead of the coconut-shell activated carbon produced in Production Example 1.

Comparative Example 2

A carbonaceous material (7) having an average particle diameter of 4 µm was obtained as in Example 4 except that the coconut-shell activated carbon produced in Production Example 2 was used instead of the coconut-shell activated carbon produced in Production Example 1.

Comparative Example 3

A carbonaceous material (8) having an average particle diameter of 4 µm was obtained as in Example 1 except that only the heat treatment was performed for 50 minutes by using a nitrogen gas not containing a hydrogen chloride gas without performing the high-temperature halogen-compound treatment.

TABLE 1

| | | | high-temperature halogen-compound treatment step | | | | | heat treatment step | | |
|---|---|---|---|---|---|---|---|---|---|---|
| | | NaOH impregnation amount [wt %] | hydrogen chloride gas [vol %] | nitrogen gas [vol %] | temperature [° C.] | treatment time [min] | | nitrogen gas [vol %] | temperature [° C.] | treatment time [min] |
| Examples | 1 | 0 | 2 | 98 | 870 | 50 | | 100 | 870 | 50 |
| | 2 | 0 | 4 | 96 | 870 | 50 | | 100 | 870 | 50 |
| | 3 | 0 | 2 | 98 | 870 | 100 | | 100 | 870 | 50 |
| | 4 | 5 | 2 | 98 | 870 | 50 | | 100 | 870 | 50 |
| | 5 | 10 | 2 | 98 | 870 | 50 | | 100 | 870 | 50 |

TABLE 1-continued

| | | high-temperature halogen-compound treatment step | | | | | heat treatment step | |
|---|---|---|---|---|---|---|---|---|
| | | NaOH impregnation amount [wt %] | hydrogen chloride gas [vol %] | nitrogen gas [vol %] | treatment temperature [° C.] | treatment time [min] | nitrogen gas [vol %] | temperature [° C.] | treatment time [min] |
| Comparative examples | 1 | 0 | 2 | 98 | 870 | 50 | 100 | 870 | 50 |
| | 2 | 5 | 2 | 98 | 870 | 50 | 100 | 870 | 50 |
| | 3 | 0 | — | — | — | — | 100 | 870 | 50 |

<Analysis of Carbonaceous Material>

The carbonaceous materials (1) to (8) were each used as a sample to measure the pore volume, the hydrogen element content, the contents of the metal elements (potassium element, iron element), the BET specific surface area, the R-value, and the G-band half-value width. The results are shown in Table 2.

TABLE 2

| | | pore volume [mL/g] | hydrogen element content [mass %] | K element content [ppm] | Fe element content [ppm] | BET specific surface area [m²/g] | Raman spectrum R-value [$I_D/I_G$] | Raman spectrum G-band half-value width [cm⁻¹] |
|---|---|---|---|---|---|---|---|---|
| Examples | 1 | 1.13 | 0.392 | 190 | 35 | 2190 | 1.31 | 71.5 |
| | 2 | 1.13 | 0.395 | 110 | 25 | 2110 | 1.31 | 71.7 |
| | 3 | 1.12 | 0.381 | 30 | 15 | 2130 | 1.32 | 72.0 |
| | 4 | 1.10 | 0.295 | 200 | 35 | 2050 | 1.35 | 79.8 |
| | 5 | 1.08 | 0.185 | 215 | 35 | 2000 | 1.39 | 80.2 |
| Comparative examples | 1 | 0.73 | 0.462 | 171 | 30 | 1690 | 1.21 | 70.3 |
| | 2 | 0.73 | 0.300 | 195 | 30 | 1550 | 1.17 | 76.0 |
| | 3 | 1.05 | 0.470 | 13100 | 90 | 2100 | 1.19 | 62.2 |

<Fabrication of Electric Double Layer Capacitor>
[Fabrication of Electrode]

Each of the carbonaceous materials (1) to (8) obtained in Examples 1 to 5 and Comparative Examples 1 to 3 was mixed with styrene-butadiene rubber (SBR) of JSR Corporation, carboxymethyl cellulose (CMC) of DKS, and acetylene black of Denki Kagaku Kogyo in water at the electrode material:SBR:CMC:acetylene black=90:3:2:5 (mass ratio) to obtain a slurry. The obtained slurry was applied to an etched aluminum foil of Hohsen Corp. having a thickness of 20 μm with a bar coater and then dried at 150° C. for 7 hours under a reduced pressure atmosphere by using a glass tube oven to obtain polarizable electrodes (1) to (8). The obtained polarizable electrodes (1) to (8) each had a thickness of 100 μm.

[Assembling of Electric Double Layer Capacitor]

Each of the polarizable electrodes (1) to (8) obtained as above was used for fabricating an electric double layer capacitor as in the following procedure.

The electrostatic capacity of the electric double layer capacitor was evaluated by fabricating a 2032 type coin cell. A coin cell member of the 2032 type was obtained from Hohsen Corp. Polarizable electrodes punched out to 14 mmΦ were used. For a separator, a glass fiber separator of Nippon Sheet Glass Co., Ltd. was punched out to 17 mmΦ and used. For an electrolytic solution, a propylene carbonate solution of 1.4 mol/L triethylmethylammonium tetrafluoroborate (TEMA-BF4/PC) of Tomiyama Pure Chemical Industries was used. A coin cell was fabricated in a glove box under an argon atmosphere. Two of the polarizable electrodes were overlapped with a separator interposed therebetween and placed in a coin cell, and an electrolyte solution was injected to sufficiently impregnate the polarizable electrodes and the separator before sealing with a swaging machine.

<Method of Performance Evaluation Test of Capacitor>
[Electrostatic Capacity]

A coin cell was connected to a charging/discharging apparatus (BLS 5516, manufactured by Keisokuki Center Co., Ltd.) and charged with a constant current at a current density of 3 mA/cm² at 25° C. until the voltage reached 3.3 V and was subsequently charged at a constant voltage of 3.3 V for 2 hours. After charging, the capacitor was discharged at a constant current (a current density of 3 mA/cm²). In this process, a capacitor voltage ($V_1$, $V_2$) and a discharge time ($t_1$, $t_2$) were measured, and an electrostatic capacity of a capacitor was calculated from the following equation. The electrostatic capacity of the capacitor was then divided by a total mass of an electrode material layer in the electrodes to calculate a mass-based electrostatic capacity. This electrostatic capacity was defined as an initial capacity (3.3 V).

$$F(V_1-V_2)=-I(t_1-t_2)$$

F: capacitor's electrostatic capacity (F)
$V_1$: 2.5 (V)
$V_2$: 1.5 (V)
$t_1$: discharge time (sec) when the capacitor voltage reaches $V_1$
$t_2$: discharge time (sec) when the capacitor voltage reaches $V_2$
I: capacitor's discharge current (A)

[Energy Density]

An amount of discharged electric power from the start to the end of the discharge was divided by a total mass of an electrode material layer in the electrodes to calculate a mass-based energy density. The energy densities in this case were each defined as an initial energy density (3.3 V).

[Electrostatic Capacity and Energy Density after 300 Hours and 1000 Hours]

The capacitor was held in a constant temperature bath at 25° C. for 300 hours and 1000 hours with a voltage of 3.3 V applied thereto. Subsequently, the capacitor was taken out of the constant temperature bath, and the electrostatic capacity and the energy density were each calculated by the method described above. A retention rate of the electrostatic capacity in this case based on the initial capacity (3.3 V) was calculated as a capacity retention rate, and a retention rate of the energy density in this case based on the initial energy density (3.3 V) was calculated as an energy density retention rate.

<Analysis and Test Results>

Table 3 shows the performance evaluation test results of the electric double layer capacitors fabricated by using the carbonaceous materials obtained in Examples 1 to 5 and Comparative Examples 1 to 3.

TABLE 3

| | | initial | 3.3 V/25° C./300 Hr | | 3.3 V/25° C./1000 Hr | |
|---|---|---|---|---|---|---|
| | | capacity [F/g] 3.3 V | capacity retention rate [%] | energy density retention rate [%] | capacity retention rate [%] | energy density retention rate [%] |
| Examples | 1 | 32.3 | 94.3 | 91.9 | 84.0 | 81.9 |
| | 2 | 31.5 | 95.5 | 92.6 | 86.4 | 83.5 |
| | 3 | 31.6 | 94.1 | 91.5 | 85.2 | 83.7 |
| | 4 | 31.6 | 95.0 | 92.1 | 86.7 | 85.6 |
| | 5 | 31.0 | 93.4 | 91.0 | 89.2 | 87.3 |
| Comparative examples | 1 | 29.8 | 93.2 | 90.8 | 76.2 | 74.1 |
| | 2 | 29.0 | 94.4 | 91.5 | 78.6 | 75.7 |
| | 3 | 31.8 | 91.2 | 88.3 | 76.2 | 71.3 |

From Table 3, when the carbonaceous materials (1) to (5) obtained in Examples 1 to 5 were used, as compared to when the carbonaceous materials (6) to (8) obtained in Comparative Examples 1 to 3, the capacity retention rate and the energy density retention rate were higher after 300 hours, and the capacity retention rate and the energy density retention rate were higher even after 1000 hours. This demonstrates that using the carbonaceous material according to the present invention can achieve high capacity retention rate and energy density retention rate over a long period even in high-voltage drive.

The invention claimed is:

1. A carbonaceous material having a specific surface area of 1,800 $m^2/g$ to 3,000 $m^2/g$ according to a BET method, an R-value of 1.2 to 1.6 and a G-band half-value width of 70 $cm^{-1}$ or more according to a Raman spectrum.

2. The carbonaceous material according to claim 1, wherein the carbonaceous material is derived from a plant.

3. The carbonaceous material according to claim 1, wherein the material has a potassium element content of 1,000 ppm or less.

4. The carbonaceous material according to claim 1, wherein the material has an iron element content of 200 ppm or less.

5. The carbonaceous material according to claim 1, wherein the material has a hydrogen element content of 0.47 mass % or less.

6. A method for producing the carbonaceous material according to claim 1, the method comprising:

performing a high-temperature halogen-compound treatment by heat-treating an activated carbon having an average particle diameter of 100 μm to 10,000 μm and a specific surface area of 1,600 $m^2/g$ to 3,000 $m^2/g$ according to a BET method at 500° C. to 1,250° C. in an inert gas atmosphere comprising a halogen compound to obtain the carbonaceous material.

7. A method for producing the carbonaceous material according to claim 1, the method comprising:

impregnating an activated carbon having an average particle diameter of 100 μm to 10,000 μm and a specific surface area of 1,600 $m^2/g$ to 3,000 $m^2/g$ according to a BET method with an alkali metal hydroxide to obtain an alkali metal hydroxide-impregnated activated carbon, and performing a high-temperature halogen-compound treatment by heat-treating the alkali metal hydroxide-impregnated activated carbon at 500° C. to 1,250° C. in an inert gas atmosphere comprising a halogen compound to obtain the carbonaceous material.

8. An electrode material comprising:

the carbonaceous material according to claim 1.

9. An electrode comprising the electrode material according to claim 8.

10. An electric double-layer capacitor comprising the electrode according to claim 9.

11. The carbonaceous material according to claim 1, wherein the material has a G-band half-value width of 70 $cm^{-1}$ to 86 $cm^{-1}$ according to a Raman spectrum.

* * * * *

UNITED STATES PATENT AND TRADEMARK OFFICE
CERTIFICATE OF CORRECTION

PATENT NO. : 10,984,963 B2
APPLICATION NO. : 16/488488
DATED : April 20, 2021
INVENTOR(S) : Shohei Kobayashi et al.

It is certified that error appears in the above-identified patent and that said Letters Patent is hereby corrected as shown below:

On the Title Page

Item (73) Assignee:
"KURARAYCO., LTD."

Should read:
--KURARAY CO., LTD.--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*